United States Patent
Nice et al.

(10) Patent No.: US 10,175,072 B2
(45) Date of Patent: Jan. 8, 2019

(54) INSERTION VORTEX FLOWMETER ELEMENT

(71) Applicant: Badger Meter, Inc., Milwaukee, WI (US)

(72) Inventors: Ryan Nice, Jackson, NJ (US); Gerald Nice, Freehold, NJ (US)

(73) Assignee: Badger Meter, Inc., Milwaukee, WI (US)

(*) Notice: Subject to any disclaimer, the term of this patent is extended or adjusted under 35 U.S.C. 154(b) by 29 days.

(21) Appl. No.: 15/418,400

(22) Filed: Jan. 27, 2017

(65) Prior Publication Data

US 2018/0216975 A1    Aug. 2, 2018

(51) Int. Cl.
*G01F 1/32* (2006.01)
*G01F 5/00* (2006.01)

(52) U.S. Cl.
CPC .............. *G01F 1/3209* (2013.01); *G01F 5/00* (2013.01); *G01F 1/3254* (2013.01)

(58) Field of Classification Search
CPC ..... G01F 1/44; G01F 1/37; G01F 1/12; G01F 1/32; G01F 1/46
See application file for complete search history.

(56) References Cited

U.S. PATENT DOCUMENTS

| | | | | |
|---|---|---|---|---|
| 7,478,565 B2* | 1/2009 | Young | ................ | G01F 1/36 73/861.65 |
| 7,726,201 B2* | 6/2010 | Mattar | ................ | G01F 1/3209 73/861.24 |
| 8,370,098 B2* | 2/2013 | Hocker | ................ | G01F 1/36 702/100 |
| 8,522,625 B2* | 9/2013 | Philipps | ................ | G01F 1/22 73/861.47 |
| 8,548,753 B2* | 10/2013 | Rogers | ................ | G01F 1/3209 702/47 |
| 8,683,875 B2* | 4/2014 | Lawrence | ................ | G01F 1/40 73/861.65 |
| 8,844,371 B2* | 9/2014 | Limacher | ................ | G01F 1/74 73/861.04 |
| 8,844,372 B2* | 9/2014 | Sgourakes | ................ | G01F 1/3245 73/861.42 |
| 8,960,018 B2* | 2/2015 | Stehle | ................ | G01F 1/46 73/861.66 |
| 9,038,481 B2* | 5/2015 | Schiferli | ................ | G01F 1/3227 73/861.18 |
| 9,234,817 B2* | 1/2016 | Kishikawa | ................ | G01F 9/00 |
| 9,322,683 B2* | 4/2016 | Brosnihan | ................ | G01F 1/3218 |
| 9,423,283 B2* | 8/2016 | Strom | ................ | G01F 1/46 |
| 9,551,601 B2* | 1/2017 | Strom | ................ | G01F 1/46 |

* cited by examiner

*Primary Examiner* — Jewel V Dowtin
(74) *Attorney, Agent, or Firm* — Boyle Fredrickson, S.C.

(57) ABSTRACT

An insertion-type flowmeter adapted for removable insertion into a fluid conduit includes an elongate body having a flow opening and a vortex-generating element disposed within the flow opening at distance from the opening entry that is correlated to the size of the flow opening to define a flow conditioning space in the flow opening between the opening entry and the vortex-generating element.

18 Claims, 6 Drawing Sheets

INSERTION VORTEX FLOWMETER ELEMENT

FIELD OF THE INVENTION

This application relates to the field of fluid measurement devices. More specifically, this application relates to an insertion vortex element for generating a vortex signal at a greater amplitude, higher frequencies and for lower velocities.

BACKGROUND

It is well known that placing an elongated obstruction transverse to the direction of fluid flow within a conduit will result in the generation of vortices in the wake of the obstruction. The vortices are induced by and shed alternately from opposite sides of the obstruction, which is called a bluff body or vortex generating element. This has been referred to as the Karman effect. The frequency of the vortex shedding is proportional to the width of the bluff body and the velocity of flow, so that detecting the frequency of the detected vortices can generate signals indicative of fluid flow velocity.

Various flow meters have been developed to measure flow based on the recognized Karman effect. Despite the multitude of differently constructed flowmeters, there is still a further need to provide an improved flowmeter, and especially an improved flow meter which is of the insertion-type, i.e., a universal flow meter directly insertable into pipes or conduits with different diameters rather than being constructed in a casing having a pre-determined diameter to match the pipe next to which it is applied, i.e., the casing carrying the flow meter must be adapted to fit more or less flush between two joining pipe sections. Such insertion-type flow meters are advantageous since they eliminate the need to change the dimensions and construction of the flow meter and casing according to the diameter of the pipe to which they are applied. Thus, insertion-type flow meters are generally more cost effective since it is not necessary to purchase a different size flow meter for a given diameter. Moreover, such an insertion type flow meter is easily insertable and removable from a pipe for easy access for repairs, replacement or the like.

However, a major shortcoming of flowmeters designed to detect vortex shedding arises from external forces and accelerations in the attached piping systems. Because the physical detection member of a vortex flowmeter is designed to be deflected by the vortices, any other forces which would cause deflection, such as external vibration of the conduit, non-uniform flow, etc. may be detected as well. This is especially true at lower fluid velocities when the vortex strength is diminished and the reflect of the external forces has a greater effect. The external forces (the "noise") thereby adversely affect the accuracy of the signal generated by the physical member. Although many compensating methods have been employed to minimize the noise effect, each has the potential for only small or inadequate reduction of the influences of noise.

Not only is there a need to provide an improved insertion-type flow meter with the aforementioned advantages, but there has also been a need to eliminate the problems associated with vortex shedding flow meters heretofore which do not adequately compensate for flow disturbances which interfere with the measurement of the vortices and thereby producing inaccurate measurements of fluid velocity. In this regard, it is desirable to provide a flow meter configured for minimizing or compensating for unwanted fluid pulsations and vibrations that can occur within the conduit as well as other forms of fluid noise which tend to interfere with the accuracy and operation of the flow meter.

What is needed is an insertion vortex meter configured for generating a vortex signal that reduces the effect of noise while still generating a uniform signal for a wide range of velocities of fluid flow.

SUMMARY OF THE INVENTION

The present invention provides a flowmeter comprising an elongate body which is cylindrical in shape and defines an elongation direction. The elongate body is provided with a flow opening bounded by a top wall, a bottom wall, and a pair of sidewalls. The flow opening extends completely through the elongate body in an opening direction transverse to the elongation direction to allow a stream of fluid to pass through the elongate body through the flow opening when the body is disposed in a stream of fluid with the opening direction aligned with the direction of flow of the stream. The flowmeter further includes an inset vortex-generating element for generating vortices and directing the vortices to impinge on the top and bottom walls in an alternate fashion. Further provided is a first sensor disposed on a first offset diaphragm within the top wall, a second sensor disposed on a first offset diaphragm within the bottom wall, and output means associated with each of the first and second sensors for generating a sensor output signal indicative of the force applied to each of the first and second sensors.

In one more detailed aspect, an insertion-type flowmeter adapted for removable insertion into a fluid conduit includes an elongate body having an elongate body axis for insertion into fluid conduits of different diameters, the elongate body including a flow opening defined by a top wall, a bottom wall, and a pair of side walls extending between the top and bottom walls, the flow opening extending from an opening entry to an opening exit perpendicular to the elongate body axis and completely through the elongate body elongate body. The flowmeter further includes a vortex-generating element disposed within the flow opening for generating substantially uniform vortices and directing said vortices to impinge on said top wall and said bottom wall in an alternate fashion, the vortex generating element being disposed at distance from the opening entry that is correlated to the size of the flow opening to define a flow conditioning space in the flow opening between the opening entry and the vortex-generating element. The flowmeter yet further includes a first pressure element disposed within said elongate body and adjacent said top wall and a second pressure element disposed within said elongate body and adjacent said bottom wall, so that said first and second pressure elements are operative to sense said vortices impinging on said top wall and said bottom wall, respectively. The flowmeter further includes an output means associated with each of said first and second pressure elements for generating an output signal indicative of the force applied to each of said first and second pressure elements.

In another embodiment of the invention, the vortex-generating element is machined from the elongate body so as to be integral to the elongate body. The vortex-generating element may include a forward face plate perpendicular to the opening direction and a tail piece disposed rearwardly of the face plate, where a correlation between the size of the flow opening and the distance from the opening entry to the vortex-generating element is a ratio that is approximately 0.85. The distance from the opening entry to the vortex-generating element may be approximately 0.440 inches.

In another embodiment of the invention, the tail piece includes a curved portion and a straight, tapering portion, the curved portion being between the forward face plate and the straight, tapering portion.

In another embodiment of the invention, the elongate body further includes an upper cavity within the elongate body adjacent the top wall that includes an upper sensor repository and a lower cavity within the elongate body adjacent the bottom wall that includes a lower sensor repository, wherein the upper and lower sensor repositories and disposed to be offset from the elongate body axis. The upper and lower sensor repositories may further include an upper counter bore and a lower counter bore concentric within the upper and lower sensor repositories and adjacent to the top and bottom walls. In this exemplary embodiment, piezoelectric sensors are disposed with the upper and lower counter bores and secured in a sensor position by at least an epoxy and a potting material. The offset from the elongate body axis may determined based on the distance between the opening entry and the vortex generating element.

In another more detailed aspect, a insertion-type flowmeter adapted for removable insertion into a fluid conduit includes an elongate body having an elongate body axis for insertion into fluid conduits of different diameters, the elongate body including a flow opening defined by a top wall, a bottom wall, and a pair of side walls extending between the top and bottom walls, the flow opening extending from an opening entry to an opening exit perpendicular to the elongate body axis and completely through the elongate body elongate body and a vortex-generating element disposed within the flow opening for generating substantially uniform vortices and directing said vortices to impinge on said top wall and said bottom wall in an alternate fashion, the vortex generating element being disposed at distance from the opening entry that is correlated to the size of the flow opening to define a flow conditioning space in the flow opening between the opening entry and the vortex-generating element. The flowmeter further includes at least one pressure element disposed within said elongate body and adjacent to at least one of the top or bottom wall, the at least one pressure element being operative to sense said vortices impinging on the adjacent top wall or bottom wall and an output means associated with each of said first and second pressure elements for generating an output signal indicative of the force applied to each of said first and second pressure elements.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

Figure 1:
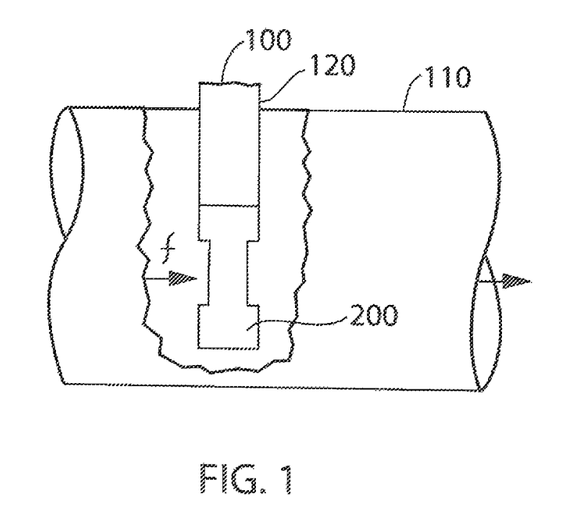
FIG. 1 is a side view of an insertion flow meter inserted into a fluid stream within a conduit, which is partially cut away for clarity of illustration, according to an exemplary embodiment.

Referring first to FIG. 1, a side view of an insertion flow meter 100 inserted into a fluid stream within conduit 110, which is partially cut away for clarify of illustration, is shown, according to an exemplary embodiment. The insertion flow meter 100 is adapted to be inserted in the conduit 110 and into a flow of fluid to be measured that is flowing in a flow direction $f$. Although an exemplary conduit 110 and insertion flow meter 100 are shown, it should be understood by one of ordinary skill in the art that the insertion type flow meter element described below may be utilized in a variety of conduits and with a variety of flowmeters to provide the vengeance described herein.

The insertion flow meter 100 may be configured to include an extension bar 120 and an insertion-type flow meter element 200, element 200 being described in further detail below with reference to FIGS. 2-4. Extension bar 120 may be attached to insertion-type flow meter element 200 to facilitate insertion and placement of element 200 into the conduit 110. The extension bar 120 may be sized based on different diameters of conduits 110 such that the insertion-type flow meter element 200 will be approximately positioned at a center of the conduit 110. The extension bar 120 may also be configured to isolate and carry electrical wiring propagating signals from the insertion-type flow meter element 200, for example to a flow computer (not shown).

Figure 2A:
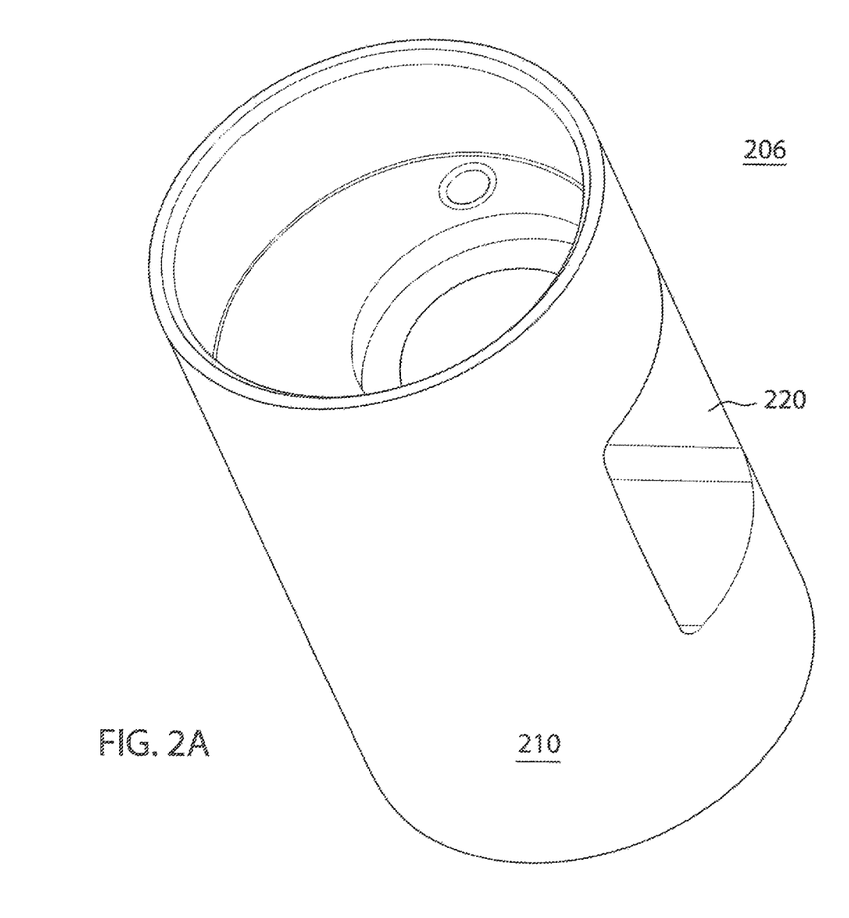
FIGS. 2A-C are a perspective view, a front view and a side view, respectively, of the insertion-type flow meter element shown in FIG. 1, according to an exemplary embodiment.
Figure 2B:
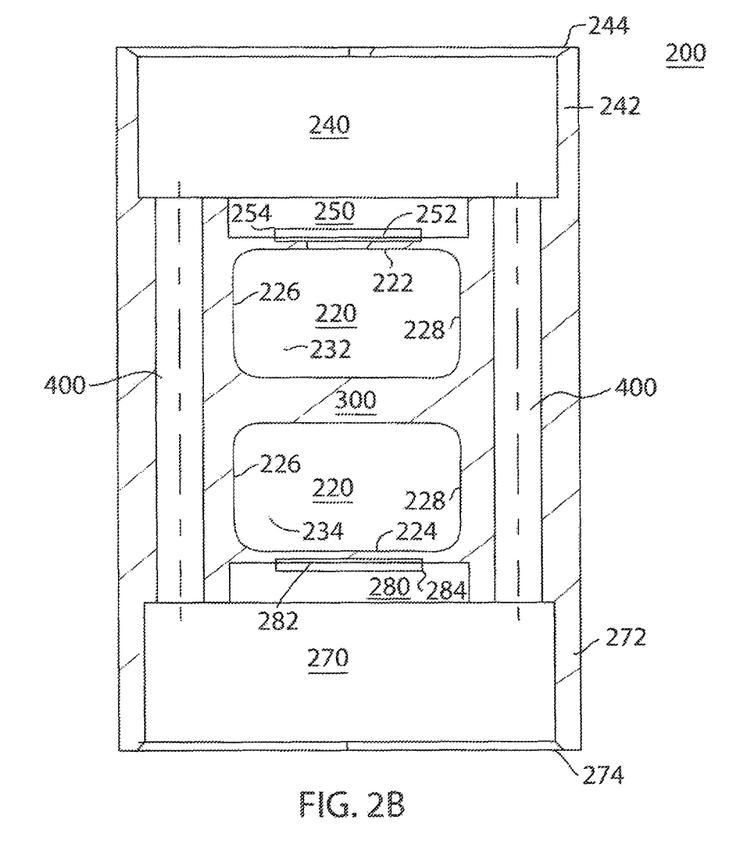
Figure 2C:
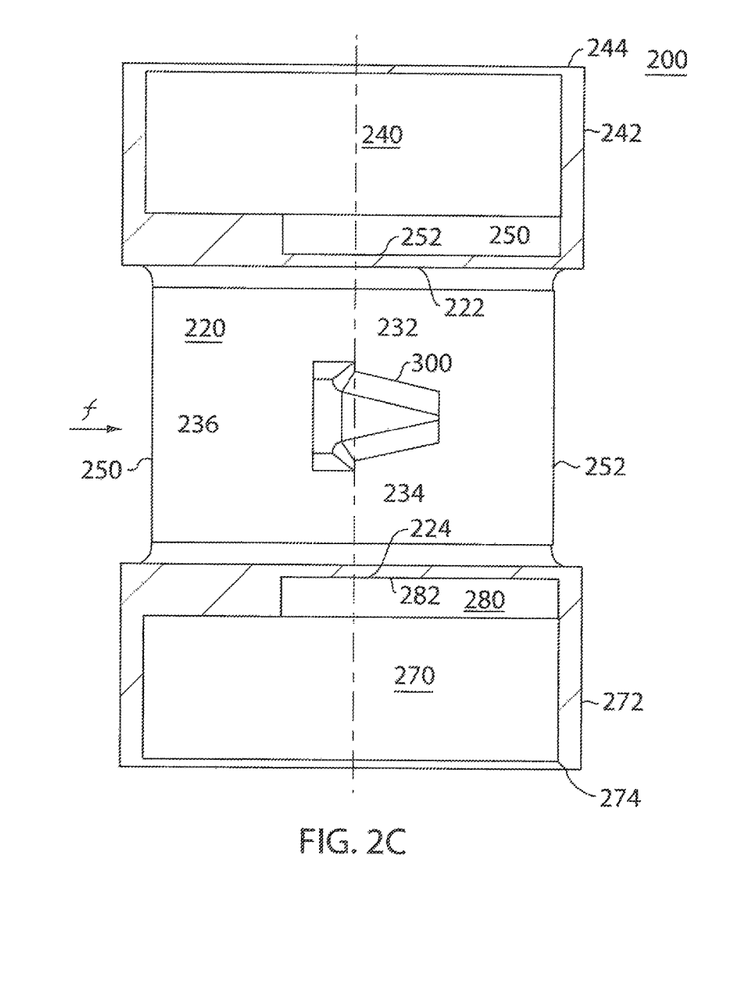

Referring next to FIGS. 2A-C, a perspective view, a flow view and a side view, respectively, of the insertion-type flow meter element 200 are shown, in accordance with one embodiment of the present invention. Flow meter element 200 includes a bar-like metallic casing or elongate body 210, which may be machined from a bar of stainless steel and is cylindrical in shape. In an alternative embodiment, elongate body 210 may be formed from plastic of any other material, for example, in a molding process. Elongate body 210 is constructed to form a flow opening 220 therein which extends completely through body 210 between an opening entry 250 and an opening exit 252. An opening axis for flow opening 220 is generally perpendicular to an elongate both axis for elongate body 210. Flow opening 220 is formed to allow a stream of fluid or the like to pass through body 210 when flow meter element 200 is inserted into the stream of fluid flowing within the conduct 110 of FIG. 1 the opening direction of flow opening 220 is aligned with the direction of the flow of the stream of fluid.

As shown in FIG. 2B, flow opening 220 is bounded by a top wall 222, a bottom wall 224, and side walls 226 and 228. Flow opening 220 is rectangular in shape with side walls 226 and 228 thus longer in length the top and bottom walls 222 and 224. It should be appreciated that relative terms such as upper and lower, above and below, etc. as used herein are to indicate directions relative to an imaginary plane extending through the center of flow opening 220 and parallel to the opening direction, when the flow meter element 200 is viewed in a vertical insertion direction as shown in FIG. 1 for example. In the particular embodiment illustrated, the upward direction is a direction parallel to the elongate body axis for elongate body 210. Thus, it should be understood as referring to the frame of reference with respect to this imaginary plane and not necessarily to the ordinary gravitational frame of reference.

In one embodiment, of the invention, the height of flow opening 220 between top wall 222 and bottom wall 224 is approximately 0.812 inches. The width of opening 220 between side walls 226 and 228 is approximately 0.612 inches. The depth of opening 220 along the opening axis for flow opening 220 is approximately 1.25 inches.

Disposed within flow opening 220 is a vortex-generating element 300, described in further detail below with reference to FIG. 3. Referring still to FIG. 2B, in which vortex-generating element 300 is shown in situ within the meter element 200. Vortex-generating element 300 may be configured to extend across side walls 226 and 228 and is positioned within flow opening 220 so as to bisect or partition flow opening 220 into a first upper flow opening 232 and a second lower flow opening 234. In one element, vortex-generating element 300 is disposed directly in the center of flow opening 220 such that upper flow opening 232 and lower low opening 234 have substantially equal volumes and equal cross-sectional areas measured in sectioning planes perpendicular to the opening direction.

According to an exemplary embodiment, vortex-generating element 300 is a machined element. Specifically, vortex-generating element 300 is formed to machining flow opening 220 to remove material from the elongate body 210 within flow opening 220 that does not include the vortex-generating element 300. According to this exemplary embodiment, vortex-generating element 300 may be a single piece of stainless steel machined to create the features described herein. Alternatively, vortex-generating element 300 may be formed plastic or other materials molded to create the features described herein. Advantageously, a machined or formed flow meter element 200 that is formed from a single piece as described herein does not require o-rings, seals, and/or other features that may be subject to degradation and failure over time. Although one piece embodiments made from specific materials are described in the exemplary embodiment, one of ordinary skill in the art would recognize that the advantages described herein may be achieved in using additional implementations and materials.

In a machined flow meter element 200, the corners joining edges, such as top and bottom walls 222 and 224 to side walls 226 and 228 have a curvature as opposed to a sharp corner. Specifically, in an exemplary embodiment, the corners between top wall 222 or bottom wall 224 and a sidewall 226 or 228 has a curvature with a radius of 0.062 inches. Similarly, a corner defined the juncture of vortex-generating element 300 and a sidewall 226 or 228 has a curvature with a radius of 0.047 inches.

As shown in FIG. 2C, vortex-generating element 300 is recessed within opening 220 such that opening 220 defines a space between from the vortex-generating element 300 and the entry to opening 220 receiving the flow of fluid from the upstream direction of the flow $f$ hereinafter referred to as a flow conditioning space 236. As stated previously, a flow of fluid within conduit 110 is typically not uniform across the diameter of conduit 110. External forces acting on conduit 110, such as impacts, vibrations, etc. as well as non-uniform acceleration or decelerations in the fluid flow, for example caused by obstructions or turns in the conduit 110, can be among the factors which cause the non-uniform flow, particularly at lower fluid velocities. The disruptions to uniformity can affect vortex generation by the vortex-generating element 300 such that the vortex strength interacting with top wall 222 or bottom wall 224 may be diminished causing signal modulation or complete signal breakdown such that flow measurement accuracy is affected.

Recessing the vortex-generating element 300 at a distance of approximately 0.440 inches within opening 220 to define a significant flow conditioning space 236 allows the space to act as a flow conditioner. Although the exemplary embodiment has the vortex-generating element 300 recessed at a distance of approximately 0.440 inches within opening 220, the element 300 may be recessed at a distance that is correlated to the area of first upper flow opening 232 and a second lower flow opening 234. The correlation between the size of the flow opening and the distance from the opening entry to the vortex-generating element is a ratio that is approximately 0.85. The approximation may be such that the actual value is within 15% of the approximate value to achieve the advantages described herein.

Fluid entering opening 220 is bounded by top wall 222 and bottom wall 224 and moved within opening 220 by the pressure created by the flow $f$. The greater the distance between entry and opening 220 and the vortex-generating element 300, the greater the flow conditioning effect. However, the greater the distance between entry and opening 220, the less space that exists for vortex generation and disbursement to interact with top wall 222 or bottom wall 224 in the area downstream from the vortex-generating element 300. The flow conditioning space 236 reduces the noise prior to introduction of the flow $f$ to the vortex-generating element 300.

Figure 3:
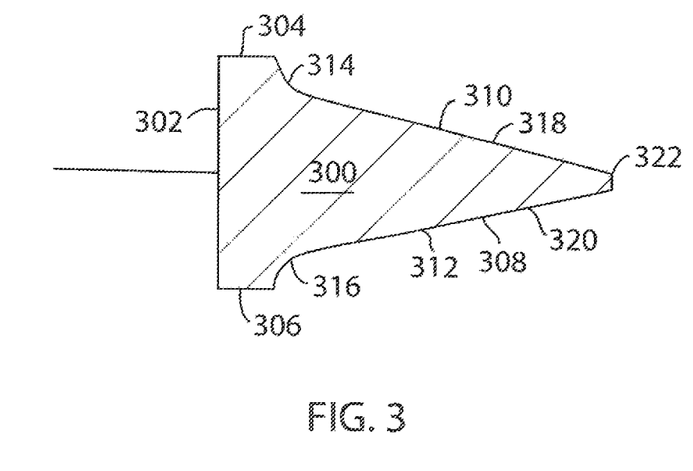
FIG. 3 is a side cut-away view of a vortex-generating element positioned within the insertion-type flow meter element of FIG. 2, according to an exemplary embodiment.

Referring now to FIG. 3, a side cut-away view of a vortex-generating element 300 which includes face plate 302 extending perpendicularly to the opening direction of opening 220 in the upstream direction of the flow $f$. The vortex-generating element 300 further includes upper and lower minor surfaces 304 and 306 which extend substantially parallel to the direction of flow $f$. Vortex-generating element 300 further includes a rearwardly extending tail piece 308 which is disposed downstream from face plate 302 and extends transverse thereto and generally parallel to the flow direction. Tail piece 308 may be integrally formed during the machining process with face plate 302 and includes inwardly tapering upper and lower walls 310 and 312 which extend from upper and lower minor surfaces 304 and 306 respectively. Upper and lower walls 310 and 312 include curved lower wall portions 314 and 316, respectively, and straight lower wall portions 318 and 320, also respectively. Curved lower wall portions 314 and 316 define a curve between upper and lower minor surfaces 304 and 306 and the straight lower wall portion 318 and 320 such that the curved lower wall portions 314 and 316 curve inward toward a vortex-generating axis of the vortex-generating element 300. In one embodiment, the radius of the curvature is approximately 0.032 inches. The straight lower wall portions 318 and 320 taper inwardly to end at a rear minor surface 322, which is generally parallel to face plate 302. In an exemplary embodiment, the straight lower wall portions 318 and 320 taper inwardly such that the angle between each of the lower wall portions 318 and 320 and the axis of the vortex-generating element 300 is approximately 13 degrees.

In an exemplary embodiment, face plate 302 has a width w of 0.612 inches to extend across the entire length of the opening 220 between side wall 226 and side wall 228. Further, face plate 302 has a height h of 0.202 inches. Vortex-generating element 300 from the face plate 302 to the rear minor surface 322 has a depth d of approximately 0.340 inches.

The proportions and dimensional relationships of the vortex-generating element 300 and the flow opening 220 are interrelated to maximize vortex generation. Flow meter 200 is machined such that the fluid vortices generated by element 300 impinge significantly, on top wall 222 and bottom wall 224 when flow meter 200 is placed in the stream of fluid. Although other geometrical shapes for fluid opening 220 may be used with the present invention, it has been found that the use of a rectangular opening for flow opening 220 provides excellent even and well-defined vortices.

Specifically, the ratio between the area A of face plate 302 defined by its length l×width w to the area of upper flow opening 232 measured by the half the height of the side walls 226 and 228 after the height of the vortex-generating element 300 has been subtracted×the between the side walls 226 and 228. In the embodiment described herein, the area A of the face plate 302 is 0.202 inches×0.612 inches or 0.124 square inches and the area B1 or B2 for each opening is ½(0.812 inches−0.202)×0.612 inches) or 0.187 square inches. Accordingly, the ratio A/B1, is 0.66. One of ordinary skill in the art would appreciate that the distances and rations provided herein, although specifically provided, may be approximate values. In alternative embodiments, as stated previously, an approximation may be such that the actual value is within 15% of the approximate value to achieve the advantages described herein. Outside these ratios, the signal created by the alternating vortices loses accuracy as the vortices may not consistently impart a strong enough force on top and bottom walls 222 and 224 and sensor elements 254 and 284 for reliable measurement of fluid velocity.

Referring to FIGS. 2A-C and 4, a first chamber or upper cavity 240 positioned above flow opening 220 is formed in body 210. A second chamber or lower cavity 270 positioned below flow opening 220 is also formed in body 210. Upper and lower cavities 240 and 270, respectively, are machined into body 210 from the top or bottom to a distance less that the distance to the opening 220 such that the cavities 240 and 270 are isolated from the stream of flow through opening 220. First cavity 240 is cylindrical and concentric with the cylindrical shape of elongate body 210 such that the cavity 240 has a cavity radius of 1.125 inches less than a elongate body radius of 1.250 incites. The distance between the cavity radius and the elongate body radius defines a cavity 240 outer wall 242. Provided on an upper portion of the wall 242 is an upper cavity chamfer 244 configured to interface with the extension bar 120 to secure the element 200 to the extension bar 120.

Likewise, lower cavity 270 is cylindrical and concentric with the cylindrical shape of elongate body 210 and includes a circumferential wall 272 extending downwardly and surrounding the lower cavity 270. Provided on a lower portion of the wall 272 is a lower cavity chamfer 274 configured to interface with a closure cap to enclose the bottommost end of lower cavity 270. The closure cap seals lower cavity 270 and is also cylindrical in shape.

Upper cavity 240 and lower cavity 270 may further include additional cylindrical and concentric cavities machined to extend from cavities 240 and 270 towards, but not entering into, opening 220, creating upper sensor repository 250 and lower sensor repository 280, respectively. Repositories 250 and 280 may be machined to have a diameter of 0.750 inches, and a depth of 0.102 inches. The portions of top wall 222 and bottom wall 224 between cavities 240 and 270, respectively and opening 220 are configured to act as diaphragms for receiving the vortices generated by vortex-generating element 330, as described in further detail below.

Figure 4:
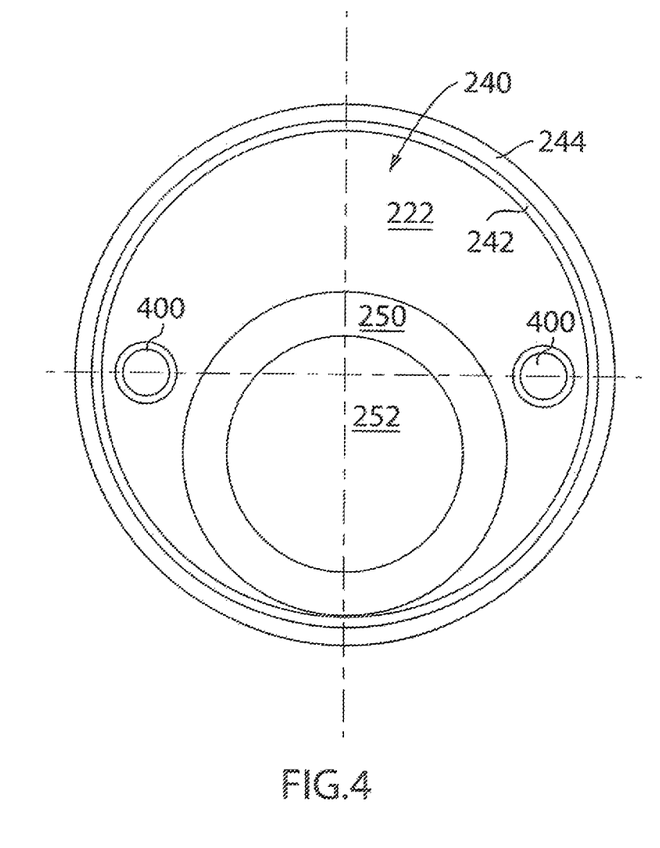
FIG. 4 is a top-down view of the insertion-type flow meter element of FIG. 2, according to an exemplary embodiment.

Referring now to FIG. 4, a top-down view of the insertion-type flow meter element 200 is shown, in accordance with one embodiment of the present invention. As shown in FIGS. 2B, 2C and 4, repositories 250 and 280 may be positioned in the center of flow meter element 200, when viewed from the front, but in an offset position from the center of flow meter element 200, when viewed from a side. Specifically, a center of the cylinder defined by repositories 250 and 280 may be positioned to be offset from a center of the flow meter element 200 by 0.187 inches towards the downstream side of flow meter element 200, according to the exemplary embodiment shown. Advantageously, offsetting repositories 250 and 280 positions the repositories to receive the maximum effect from vortices generated by the vortex-generating element 300.

Repositories 250 and 280 may further include additional cylindrical and concentric cavities machined to extend from repositories 250 and 280 toward, but not entering into, opening 220, creating upper counter bore 252 and lower counter bore 282, respectively. Upper counter bore 252 and lower counter bore 282 may be machined to have a diameter of 0.550 inches, and a depth of 0.005 inches. Upper counter bore 252 and lower counter bore 282 are configured to receive sensors 254 and 284, as described in further detail below.

Advantageously, machining upper counter bore 252 and lower counter bore 282 into repositories 250 and 280 to receive sensors 254 and 284 facilitates maintenance of the positioning of the sensors to receive the maximum effect from vortices generated by the vortex-generating element 300 during an adherence and potting process. A combination of epoxies and potting materials may be used to secure sensors 254 and 284 within repositories 250 and 280.

First and second pressure-sensitive sensors 254 and 284 are respectively disposed within upper counter bore 252 and lower counter bore 282, and are flat, circular, platelike quartz piezoelectric elements in an exemplary embodiment. Sensors 254 and 284 are bonded within counter bores 254 and 284 respectively using an adhesive.

Each pressure sensitive sensor 254 and 284 is a deformable body arranged to allow development of an electrical potential between its major surfaces as described below when the wall and the sensors are deformed. This electrical potential varies in accordance with the degree of deformation and thus varies with the force supplied to deform the wall and the sensor. As known to those skilled in the art, such piezoelectric sensors can develop appreciable electrical potentials even when the deformations involved are rather small or even at a molecular level.

Referring now to FIGS. 2B and 4, within elongate body 210 is also disposed first and second conductor channels 400 extending upwardly and downwardly, i.e., parallel to the longitudinal axis of body 210. Channels 400 extend from upper cavity 240 to lower cavity 270. The conductor channels have a diameter of 0.125 inches and are configured to carry a conductor (not shown) from lower cavity 210 to upper cavity 240 through the side of elongate body 210 so as to remain within flow meter 200 and isolated from the stream of flow.

In use, flow meter 200 is inserted through an insertion hole in a pipe with flow opening 220 aligned with the direction of the flow of the stream such that fluid can flow around elongate body 210 as well as through upper and lower flow openings 240 and 270. As the flowing fluid impinges on face plate 302, swirling vortices are formed and shed past face plate 302 in an alternating fashion in accordance with the above described Karman vortex principle.

These vortices alternatively impinge on both top wall 222 and bottom wall 224 and the forces are then picked up by each piezoelectric sensor which in turn generates signals at given time periods indicative of the force sensed. The signal produced from each sensor is 180 degrees out of phase with the other, i.e., as one sensor generates an independent signal indicative of the vortex pressure, the other sensor produces an equal independent signal of opposite polarity. The shifting of the vortex signal from one sensor to the other generates a composite oscillatory signal outputted front an amplifier (not shown which continues uninterrupted so long as the flow of fluid continues. The frequency of oscillation is directly related to the velocity of the fluid, and hence to the flow rate. These signals are then processed and used to determine the velocity of the flowing fluid.

An important advantage that follows from the use of the present invention's dual sensor insertion-type flow meter is the ability to minimize undesirable flow noise or extraneous disturbances that occur within a pope due to causes other than von Karman vortices. Such extraneous disturbances can interfere with the sensing of shedded vortices and thus the accuracy of the flow meter. With the present invention, however, the arrangement of the dual sensors both above and below flow opening 220 is highly advantageous. Extraneous fluid disturbances within the stream of flow will tend to impinge nearly simultaneously on both top wall 222 and bottom wall 224, and thus piezoelectric sensors 254 and 284, thereby producing signals "in phase" which can be cancelled by a differential amplifier (not shown) without disturbing the measurement of the intentionally created out of phase vortices produced by vortex-generating element 300.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:
1. An insertion-type flowmeter adapted for removable insertion into a fluid conduit comprising:
    (a) an elongate body having an elongate body axis for insertion into fluid conduits of different diameters, the elongate body including a flow opening defined by a top wall, a bottom wall, and a pair of side walls extending between the top and bottom walls, the flow opening extending from an opening entry to an opening exit perpendicular to the elongate body axis and completely through the elongate body elongate body;
    (b) a vortex-generating element disposed within the flow opening for generating substantially uniform vortices and directing said vortices to impinge on said top wall and said bottom wall in an alternate fashion, the vortex generating element being disposed at distance from the opening entry that is correlated to the size of the flow opening to define a flow conditioning space in the flow opening between the opening entry and the vortex-generating element;
    (c) a first pressure element disposed within said elongate body and adjacent said top wall;
    (d) a second pressure element disposed within said elongate body and adjacent said bottom wall, so that said first and second pressure elements are operative to sense said vortices impinging on said top wall and said bottom wall, respectively; and
    (e) output means associated with each of said first and second pressure elements for generating an output signal indicative of the force applied to each of said first and second pressure elements,
    wherein the tail piece includes a curved portion and a straight, tapering portion, the curved portion being between the forward face plate and the straight, tapering portion.

2. The meter of claim 1, wherein said vortex-generating element is machined from the elongate body so as to be integral to the elongate body.

3. The meter of claim 2, wherein the vortex-generating element includes a forward face plate perpendicular to the opening direction and a tail piece disposed rearwardly of the face plate.

4. The meter of claim 3, wherein the correlation between the size of the flow opening and the distance from the opening entry to the vortex-generating element is a ratio that is approximately 0.85.

5. The meter of claim 4, wherein the distance from the opening entry to the vortex-generating element is approximately 0.440 inches.

6. The meter of claim 1, wherein the elongate body further includes an upper cavity within the elongate body adjacent the top wall that includes an upper sensor repository and a lower cavity within the elongate body adjacent the bottom wall that includes a lower sensor repository, wherein the upper and lower sensor repositories and disposed to be offset from the elongate body axis.

7. The meter of claim 6, wherein the upper and lower sensor repositories include an upper counter bore and a lower counter bore concentric within the upper and lower sensor repositories and adjacent to the top and bottom walls.

8. The meter of claim 7, further including piezoelectric sensors disposed with the upper and lower counter bores and secured in a sensor position by at least an epoxy and a potting material.

9. The meter of claim 6, wherein the offset from the elongate body axis is determined based on the distance between the opening entry and the vortex generating element.

10. An insertion-type flowmeter adapted for removable insertion into a fluid conduit comprising:
    (a) an elongate body having an elongate body axis for insertion into fluid conduits of different diameters, the elongate body including a flow opening defined by a top wall, a bottom wall, and a pair of side walls extending between the top and bottom walls, the flow opening extending from an opening entry to an opening exit perpendicular to the elongate body axis and completely through the elongate body elongate body;
    (b) a vortex-generating element disposed within the flow opening for generating substantially uniform vortices and directing said vortices to impinge on said top wall and said bottom wall in an alternate fashion, the vortex generating element being disposed at distance from the opening entry that is correlated to the size of the flow opening to define a flow conditioning space in the flow opening between the opening entry and the vortex-generating element;
    (c) at least one pressure element disposed within said elongate body and adjacent to at least one of the top or bottom wall, the at least one pressure element being operative to sense said vortices impinging on the adjacent top wall or bottom wall; and
    (d) output means associated with each of said first and second pressure elements for generating an output signal indicative of the force applied to each of said first and second pressure elements, wherein the tail piece includes a curved portion and a straight, tapering portion, the curved portion being between the forward face plate and the straight, tapering portion.

11. The meter of claim 10, wherein said vortex-generating element is machined from the elongate body so as to be integral to the elongate body.

12. The meter of claim 11, wherein the vortex-generating element includes a forward face plate perpendicular to the opening direction and a tail piece disposed rearwardly of the face plate.

13. The meter of claim 3, wherein the correlation between the size of the flow opening and the distance from the opening entry to the vortex-generating element is a ratio that is approximately 0.85.

14. The meter of claim 13, wherein the distance from the opening entry to the vortex-generating element is approximately 0.440 inches.

15. The meter of claim 10, wherein the elongate body further includes at least one cavity within the elongate body adjacent to one of the top or bottom wall that includes a sensor repository that is positioned to be offset from the elongate body axis.

16. The meter of claim 15, wherein the sensor repository includes a counter bore concentric within the sensor repository and adjacent to the top or bottom wall.

17. The meter of claim 16, further including at least one piezoelectric sensor disposed within the counter bore and secured in a sensor position by at least an epoxy and a potting material.

18. The meter of claim 15, wherein the offset from the elongate body axis is determined based on the distance between the opening entry and the vortex generating element.

* * * * *